Jan. 2, 1968   G. K. OERTEL ET AL   3,361,045

FAST-OPENING DIAPHRAGM

Filed Aug. 24, 1965

INVENTORS
GOETZ K. OERTEL
ROGER D. BENGTSON

BY
*G H McCoy*
*William H. King*
ATTORNEYS

United States Patent Office 3,361,045
Patented Jan. 2, 1968

3,361,045
FAST-OPENING DIAPHRAGM
Goetz K. Oertel, Williamsburg, Va., and Roger D. Bengtson, Hyattsville, Md., assignors to the United States of America as represented by the Administrator of the National Aeronautics and Space Administration
Filed Aug. 24, 1965, Ser. No. 482,307
11 Claims. (Cl. 95—53)

The invention described herein may be manufactured and used by or for the Government of the United States of America for governmental purposes without the payment of any royalties thereon or therefor.

The invention relates generally to a fast-opening diaphragm and more specifically concerns a diaphragm that is opened by the sudden application of a large magnetic field to it.

In expansion tubes and in numerous optical applications, it is desirable to have jitter-free, fast-opening, large diaphragms to act as gas valves or as high speed shutters. Previously, in expansion tube applications, a sudden rise in gas pressure caused by a shock wave was used to burst diaphragms and in optical applications either mechanically operated shutters or Kerr cells were used.

The use of gas pressure to rupture diaphragms, and to remove the ruptured diaphragms from the flow regions causes loss of energy which results in a very inefficient operation of the expansion tube. As for the optical shutters heretofore available, the mechanical devices are quite slow and have considerable jitter. With this jitter, the shutters cannot be opened at a predetermined time with the accuracy needed for many modern applications such as magnetic compression experiments and other extremely bright transient events. The Kerr cells open quickly but they have a low transmission, a poor closed-open transmission ratio, and a small aperture (maximum of one-to-two inches wide).

It is therefore an object of this invention to provide a jitter-free, fast-opening diaphragm.

Another object of this invention is to provide a jitter-free, fast-opening diaphragm suitable for use in expansion tube applications.

It is a further object of this invention to provide a jitter-free, fast-opening, diaphragm suitable for use as an optical shutter.

Still another object of this invention is to provide an opening diaphragm that has a large aperture.

A still further object of this invention is to provide an opening diaphragm that has a good closed-open transmission ratio.

Yet another object of this invention is to provide a diaphragm that can be opened at a predetermined time with the accuracy needed for modern applications.

Yet another object of this invention is to provide an opening diaphragm that has a high transmission for all wavelengths.

In accomplishing these and other objects the present invention consists essentially of an electrically conductive thin diaphragm located in the path of the flowing gas when used in expansion tube operations and in the optical path of the camera when used as an opening shutter. When used as a shutter, a closing shutter must also be provided. A coil is located around the path close to the diaphragm with an insulator between the diaphragm and coil. The coil is connected in an electrical circuit in series with a spark gap switch and a bank of capacitors. The bank of capacitors is charged by a generator and then a trigger pulse is applied to the spark gap switch causing it to fire. The resulting surge of current through the coil creates a magnetic field which applies a sufficient magnetic pressure to the diaphragm to burst it.

Other objects and advantages of this invention will further become apparent hereinafter and in the drawings, in which.

Figure 1:
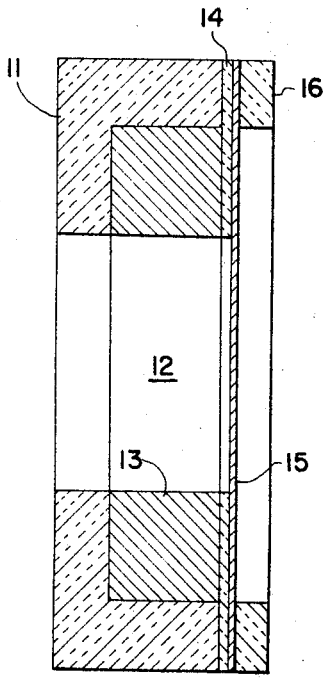
FIG. 1 is a cross-sectional view of the physical relation of the coil to the diaphragm and the path that is blocked by the diaphragm.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 in FIG. 1 designates generally an enclosure of a passageway 12 through which the gas of an expansion tube is to flow or the light to a camera is to pass. Enclosure 11 is made from a suitable dielectric material such as phenolic. Enclosure 11 and passageway 12 have cross-sections that are preferably circular; however, they can be of any other shape without departing from the spirit and scope of this invention. A large single turn coil 13 is set into a groove cut in enclosure 11 such that the coil 13 surrounds passageway 12. Coil 13 is shown as being a single turn coil; however, it can be a multiturn coil. A piece of dielectric material 14 such as Mylar with a hole in it the size of passageway 12 is placed against enclosure 11 and coil 13. A thin electrically conductive diaphragm 15 made from a material such as aluminum or copper is placed against the dielectric material 14. Then a support piece 16 made from a suitable dielectric material such as phenolic is placed against diaphragm 15 and attached to enclosure 11 by any suitable means such as bolts to hold dielectric 14 and diaphragm 15 in place. Since there will be large stresses on diaphragm 15, it is necessary that it be securely clamped between support piece 16 and enclosure 11 to prevent tearing of the diaphragm. The thickness of the coil 13 must be much greater than the electromagnetic skin depth, and the thickness of the diaphragm 15 should be equal to or larger than the electromagnetic skin depth.

Figure 2:
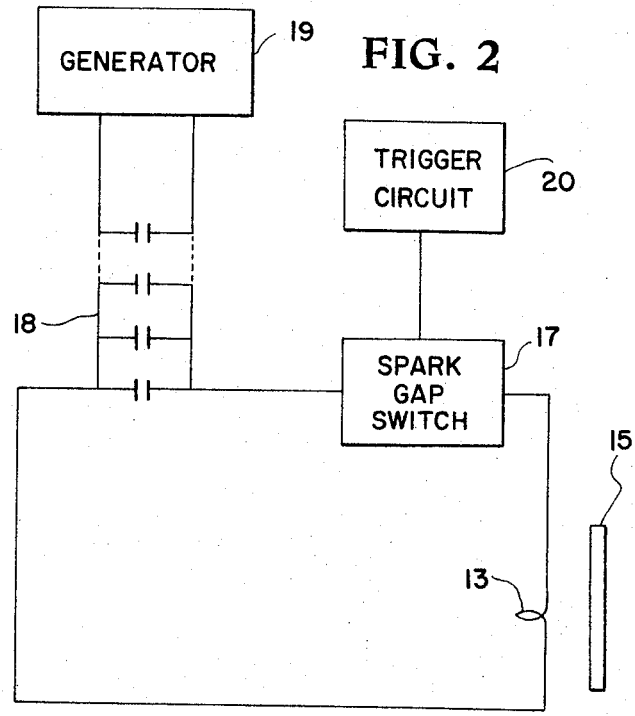
FIG. 2 is a schematic drawing of the electrical circuitry used in this invention.

Referring now to FIG. 2, the coil 13 is shown connected into an electrical circuit in series with a spark gap switch 17 and a bank of capacitors 18. For efficient operation, the bulk of the system inductance in the circuit in FIG. 2 should be in the single turn coil 13. The bank of capacitors 18 has a large capacitance and is charged by any suitable means such as a generator 19. Spark gap switch 17 which is a well known type of switch is triggered to its conductive state or to its nonconductive state by a suitable trigger circuit 20. It is only necessary that trigger circuit 20 produce pulses that have amplitudes of approximately 20 kv. and rise times of approximately 10 billion volts per second.

In operation, the bank of capacitors 18 is charged by generator 19. Then a pulse from trigger circuit 20 triggers spark gap switch 17 to its conductive state causing the bank of capacitors to discharge through the single turn coil 13. The resulting magnetic field produced by coil 13 cannot penetrate diaphragm 15 to any large extent because the thickness of the diaphragm 15 is of the same order as the electromagnetic skin depth. This high magnetic field produces a large magnetic pressure which pushes the diaphragm away from the coil thereby stressing it until it ruptures.

Figure 3:
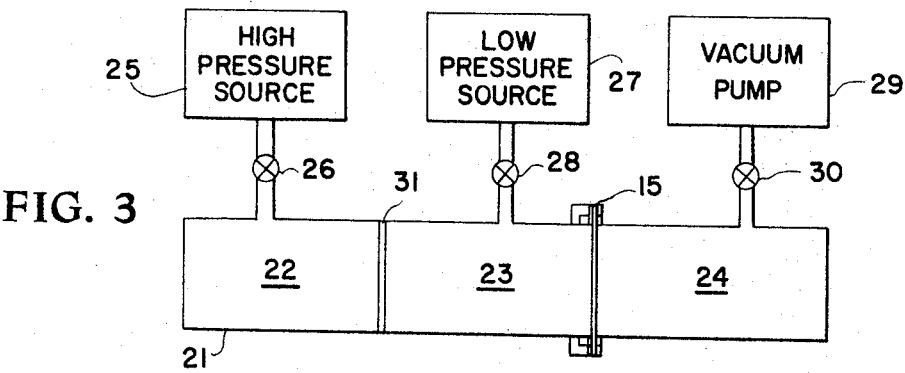
FIG. 3 is a schematic drawing of the use of this invention in an expansion tube.

As was mentioned earlier, the fast-opening diaphragm which constitutes this invention has at least two applications: one as a gas valve in an expansion tube and the other as an optical shutter for a large aperture camera. In FIG. 3 there is shown a schematic diagram as to how this invention can be used as a gas valve in an expansion tube. An expansion tube 21 consists of three different compartments 22, 23, and 24. Compartment 22 is a high pressure compartment which is supplied by a high pressure source 25 under the control of a valve 26. Low pressure compartment 23 is supplied by a low pressure source 27 under the control of a valve 28. Compartment 24 is a vacuum which is created by the means of a vacuum pump 29 under the control of a valve 30. Compartments 22 and 23 are separated by a diaphragm 31, and compartments 23 and 24 are separated by the diaphragm 15 as shown in the FIGS. 1 and 2. In operation, initially compartment 22 is at a high pressure, compartment 23 is at a low pressure and compartment 24 is a vacuum. Then by means not shown, diaphragm 31 is ruptured and the resulting high pressure in compartment 22 creates a shock wave which passes through compartment 23. Immediately prior to this shock wave in compartment 23 reaching diaphragm 15, diaphragm 15 is ruptured which allows the shock wave to pass into the vacuum compartment 24 unobstructed. Previously, diaphragm 15 was ruptured by the shock wave that passes through compartment 23. This resulted in a loss of energy which caused an inefficient operation. With the present invention, the loss of energy of the shock wave has been eliminated.

Figure 4:
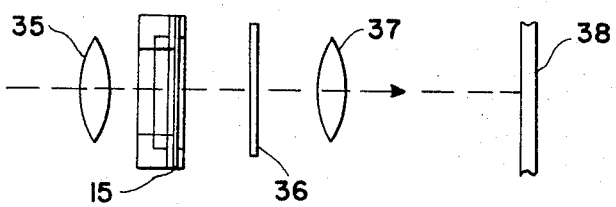
FIG. 4 is a schematic drawing of the use of this invention as an optical shutter.

In FIG. 4 there is shown a schematic diagram of a camera which utilizes this invention. To the left of a lens 35 is the object (not shown) that is to be photographed. A diaphragm 15 which constitutes this invention is located in the optical path of the camera. Also a closing optical shutter 36 and a lens 37 are located in the camera path. The image of the photographed object appears on the strip of film 38. To photograph the object, the diaphragm 15 is ruptured thereby allowing light to pass through the initially opened optical shutter 36 and along the optical path of the camera to film strip 38. Then, closing optical shutter 36 is closed a predetermined length of time after diaphragm 15 is ruptured. Fast, electromagnetic, jitter-free closing optical shutters are commercially available and will therefore not be disclosed in detail in this application.

The advantages of this invention as a gas valve in expansion tubes are that it provides a fast-opening gas valve that is jitter-free and that reduces energy losses. The advantages of this invention as an optical shutter are that it provides a fast-opening, jitter-free shutter that can be initiated by an electrical pulse; that can have a very wide aperture; that is useful in a vacuum as well as air or any gas; that is useful for wavelengths down to the soft X-ray region; and that has the best possible closed-open transmission ratio.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed as new and desired to be secured by Letters Patent of the United States is:

1. A fast-opening diaphragm for blocking the transmission of a substance at a point along its path until a predetermined time and then offering negligible resistance to the transmission of said substance at said point comprising: a thin electrically conductive diaphragm located to block the transmission of said substance at said point; means fixing said diaphragm against rotation relative to said path about any axis lying in the plane of the diaphragm; a charged bank of capacitors; a coil around said path close to said diaphragm and electrically insulated therefrom; a normally opened switch connected in series with said coil and said charged bank of capacitors; and means for closing said switch at said predetermined time whereby said bank of capacitors discharge through said coil creating a magnetic force that ruptures said diaphragm thereby allowing said substance to be transmitted unimpeded past said point.

2. A fast-opening diaphragm in accordance with claim 1 wherein the thickness of said coil is many times the skin depth and the thickness of the diaphragm is approximately equal to or larger than the skin depth.

3. A fast-opening diaphragm in accordance with claim 1 wherein said switch is a spark gap switch.

4. A fast-opening diaphragm in accordance with claim 1 wherein said means for closing said switch includes a trigger circuit that applies a triggering pulse to said switch at said predetermined time to close the switch.

5. A fast-opening diaphragm for blocking the path of a substance until some fixed time and then for unblocking said path comprising: a thin electrically conductive diaphragm blocking said path; a coil around said path close to said diaphragm; a large supply of electrical energy; and means for connecting said supply of electrical energy to said coil at said fixed time whereby the resulting current through said coil creates a magnetic field; and means positioning said diaphragm in such a manner as to produce rupture of said diaphragm by said magnetic field.

6. A fast-opening diaphragm in accordance with claim 5 wherein said coil is a single turn coil whose thickness is several times the skin depth.

7. A fast-opening diaphragm in accordance with claim 5 wherein said means for connecting said supply of electrical energy to said coil includes a normally opened spark gap switch that is closed by a pulse from a trigger circuit at said fixed time.

8. An opening camera shutter comprising: a thin electrically conductive diaphragm blocking the optical path of said camera; a coil around said optical path close to said diaphragm and electrically insulated therefrom; a large charge of electrical energy; and means for connecting said large charge of electrical energy to said coil whereby the resulting current through said coil creates a magnetic field; and means positioning said diaphragm in such a manner as to produce rupture of said diaphragm by said magnetic field thereby unblocking said optical path.

9. An opening camera shutter in accordance with claim 8 wherein said large charge of electrical energy is a charged bank of capacitors.

10. A means for blocking the flow of a gas in an expansion tube until a fixed time and then offering negligible resistance to the flow of the gas comprising: an electrically conductive diaphragm blocking the flow of gas in said expansion tube; a coil around said expansion tube close to said diaphragm and electrically insulated therefrom; a bank of charged capacitors; and means for connecting said bank of charged capacitors to said coil at said fixed time whereby the resulting current through said coil creates a magnetic field; and means positioning said diaphragm in such a manner as to produce rupture of said diaphragm by said magnetic field.

11. A fast opening shutter for controlling communication between two points on a path comprising:
- shutter means located on said path;
- a coil around said path;
- a supply of electrical energy;
- switching means to controllably connect said electrical energy source to said coil to produce an electrical current therein; and
- means positioning said shutter means in such a manner that said shutter means is completely removed from said path in response to the presence of current flow in said coil.

References Cited
UNITED STATES PATENTS 3,185,063  5/1965  Ford _____ 350—269 X
3,191,516  6/1965  Corcoran _____ 350—269 X JOHN M. HORAN, *Primary Examiner.*